United States Patent
Merzhaeuser et al.

(10) Patent No.: US 11,828,264 B2
(45) Date of Patent: Nov. 28, 2023

(54) COMPLIANT STRUCTURES FOR JOINTED ROTOR BLADES

(71) Applicant: General Electric Company, Schenectady, NY (US)

(72) Inventors: Thomas Merzhaeuser, Munich (DE); Andrew Mitchell Rodwell, Greenville, SC (US); Mohammad Salah Attia, Niskayuna, NY (US); Matthew Brian Dudon, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 257 days.

(21) Appl. No.: 17/289,987

(22) PCT Filed: Nov. 1, 2018

(86) PCT No.: PCT/US2018/058675
§ 371 (c)(1),
(2) Date: Apr. 29, 2021

(87) PCT Pub. No.: WO2020/091785
PCT Pub. Date: May 7, 2020

(65) Prior Publication Data
US 2021/0396207 A1 Dec. 23, 2021

(51) Int. Cl.
*F03D 1/06* (2006.01)
*F03D 80/00* (2016.01)

(52) U.S. Cl.
CPC ........... *F03D 1/0675* (2013.01); *F03D 80/00* (2016.05); *F05B 2210/12* (2013.01);
(Continued)

(58) Field of Classification Search
CPC .... F03D 1/0675; F03D 7/0228; F03D 7/0232; F03D 80/00; F05B 2210/12;
(Continued)

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 3144526 A1 | 3/2017 |

(Continued)

OTHER PUBLICATIONS

PCT International Search Report & Opinion Corresponding to PCT/US2018/058675 dated Jul. 22, 2019.

*Primary Examiner* — Justin D Seabe
*Assistant Examiner* — Aye S Htay
(74) *Attorney, Agent, or Firm* — Dority & Manning, P.A.

(57) ABSTRACT

A rotor blade includes a first blade segment and a second blade segment extending in opposite directions from a chord-wise joint. Each of the first and second blade segments has at least one shell member defining an airfoil surface. The first blade segment includes a beam structure having a receiving end with at least one span-wise extending pin extending therefrom. The second blade segment includes a receiving section that receives the beam structure. The receiving section includes a chord-wise member having a pin joint slot defined therethrough. The pin joint slot receives the span-wise extending pin at the receiving end of the beam structure so as to secure the first and second blade segments together. Moreover, the chord-wise member, the pin joint slot, and/or the span-wise extending pin includes at least one compliant structure formed of a compliant material that allows a deformation thereof to follow a shear deformation of the rotor blade.

16 Claims, 9 Drawing Sheets

(52) U.S. Cl.
CPC ....... *F05B 2220/30* (2013.01); *F05B 2230/60* (2013.01); *F05B 2240/221* (2013.01); *F05B 2240/30* (2013.01)

(58) Field of Classification Search
CPC .............. F05B 2220/30; F05B 2220/60; F05B 2240/221; F05B 2240/30
See application file for complete search history.

(56) References Cited

U.S. PATENT DOCUMENTS

| | | | |
|---|---|---|---|
| 4,643,646 | A | 2/1987 | Hahn et al. |
| 4,732,542 | A | 3/1988 | Hahn et al. |
| 5,281,454 | A | 1/1994 | Hanson |
| 7,334,989 | B2 | 2/2008 | Arelt |
| 7,344,360 | B2 | 3/2008 | Wetzel |
| 7,901,188 | B2 | 3/2011 | Llorente Gonzalez et al. |
| 7,922,454 | B1 | 4/2011 | Riddell |
| 7,927,077 | B2 | 4/2011 | Olson |
| 7,997,874 | B2 | 8/2011 | van der Bos |
| 7,998,303 | B2 | 8/2011 | Baehmann et al. |
| 8,123,488 | B2 | 2/2012 | Finnigan et al. |
| 8,297,932 | B2 | 10/2012 | Arocena De La Rua et al. |
| 8,348,622 | B2 | 1/2013 | Bech |
| 8,356,982 | B2 | 1/2013 | Petri Larrea et al. |
| 8,376,713 | B2 | 2/2013 | Kawasetsu et al. |
| 8,388,316 | B2 | 3/2013 | Arocena De La Rua et al. |
| 8,517,689 | B2 | 8/2013 | Kyriakides et al. |
| 8,919,754 | B2 | 12/2014 | Schibsbye |
| 9,669,589 | B2 | 6/2017 | Zamora Rodriguez et al. |
| 2007/0018049 | A1 | 1/2007 | Stuhr |
| 2007/0176051 | A1* | 8/2007 | Good ........................ B64C 9/16 244/215 |
| 2007/0253824 | A1 | 11/2007 | Eyb |
| 2009/0116962 | A1 | 5/2009 | Pedersen et al. |
| 2009/0155084 | A1 | 6/2009 | Livingston et al. |
| 2009/0162208 | A1 | 6/2009 | Zirin et al. |
| 2010/0132884 | A1 | 6/2010 | Baehmann et al. |
| 2010/0215494 | A1 | 8/2010 | Bech et al. |
| 2010/0304170 | A1 | 12/2010 | Frederiksen |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091326 | A1* | 4/2011 | Hancock ............... F03D 1/0683 29/889.7 |
| 2011/0158788 | A1 | 6/2011 | Bech et al. |
| 2011/0158806 | A1 | 6/2011 | Arms et al. |
| 2011/0229336 | A1 | 9/2011 | Richter et al. |
| 2012/0093627 | A1 | 4/2012 | Christenson et al. |
| 2012/0196079 | A1 | 8/2012 | Brauers et al. |
| 2012/0213642 | A1 | 8/2012 | Wang et al. |
| 2012/0269643 | A1* | 10/2012 | Hibbard ................ F03D 1/0675 29/889 |
| 2012/0308396 | A1 | 12/2012 | Hibbard |
| 2013/0040151 | A1 | 2/2013 | Jeromerajan et al. |
| 2013/0064663 | A1 | 3/2013 | Loth et al. |
| 2013/0129518 | A1 | 5/2013 | Hayden et al. |
| 2013/0164133 | A1 | 6/2013 | Grove-Nielsen |
| 2013/0177433 | A1 | 7/2013 | Fritz et al. |
| 2013/0189112 | A1 | 7/2013 | Hedges et al. |
| 2013/0189114 | A1 | 7/2013 | Jenzewski et al. |
| 2013/0219718 | A1 | 8/2013 | Busbey et al. |
| 2013/0224032 | A1 | 8/2013 | Busbey et al. |
| 2013/0236307 | A1 | 9/2013 | Stege |
| 2013/0236321 | A1 | 9/2013 | Olthoff |
| 2014/0286780 | A1 | 9/2014 | Lemos et al. |
| 2015/0204200 | A1 | 7/2015 | Eyb et al. |
| 2015/0240780 | A1 | 8/2015 | Leonard et al. |
| 2015/0369211 | A1* | 12/2015 | Merzhaeuser .......... F03D 80/30 416/61 |
| 2018/0223796 | A1 | 8/2018 | Yarbrough et al. |
| 2019/0277248 | A1* | 9/2019 | Herrig .................. F03D 1/0675 |

FOREIGN PATENT DOCUMENTS

| | | |
|---|---|---|
| FR | 2710871 A | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

COMPLIANT STRUCTURES FOR JOINTED ROTOR BLADES

FIELD

The present disclosure relates generally to wind turbines, and more particularly to compliant structures for jointed rotor blades for a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

As wind turbines continue to increase in size, the rotor blades also increase in size. Thus, larger rotor blades may be constructed in segments that can be assembled on site via one or more pin joints. Increasing the blade length requires additional blade support, because gravity pulls along the increased length to create a larger bending moment than in shorter rotor blades. The pin joints are configured to allow the blade tip to flex to withstand some of this load.

Wind turbine rotor blades often deflect under load. Such deflection causes internal shear deformation of the shear web of the blade. Accordingly, certain jointed rotor blades include a first blade segment having a beam structure that is received within a receiving section of a second blade segment that is further secured together via one or more span-wise and chord-wise extending pins that transfer the blade bending moment from one segment to the other. The receiving sections of such joints also have a chord-wise bulkhead that has the tendency to follow the blade shear deformation, causing local peel stress between the bulkhead and the blade shell, stressing the bond paste between receiving section and blade shell. In addition, as the chord-wise extending pin bends, the beam structure of the first blade segment also bends relative to the receiving section. Such bending causes high peak stress on the bushing holes of the pins and un-even loading of the bond lines.

Accordingly, the present disclosure is directed to an improved wind turbine jointed rotor blade having one or more compliant structures at the pin locations so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments has at least one shell member defining an airfoil surface. The first blade segment includes a beam structure having a receiving end. The receiving end includes at least one span-wise extending pin extending therefrom. The second blade segment includes a receiving section that receives the beam structure of the first blade segment. Further, the receiving section includes a chord-wise member having a pin joint slot defined therethrough. As such, the pin joint slot receives the span-wise extending pin at the receiving end of the beam structure so as to secure the first and second blade segments together. Moreover, at least one of the chord-wise member, the pin joint slot, or the span-wise extending pin includes at least one compliant structure formed of a compliant material that allows a deformation thereof to follow a shear deformation of the rotor blade.

More specifically, in one embodiment, a body of the chord-wise member and/or the span-wise extending pin may be constructed of the compliant material. In another embodiment, the rotor blade may further include a bearing assembly having a bearing received within a bearing retention housing. In such embodiments, the bearing assembly may be received within the pin joint slot. Accordingly, the compliant structure may be the bearing and/or the bearing retention housing.

In further embodiments, the bearing retention housing may be axially secured within the pin joint slot of the chord-wise member, at least in part, via a first flange. In addition, the bearing retention housing may also include a second flange for limiting rotation of the bearing within the bearing retention housing. In such embodiments, the second flange may be located on an opposite side of the bearing retention housing from the first flange. In several embodiments, the bearing retention housing may be further axially secured within the pin joint slot of the chord-wise member, at least in part, via a retaining ring. In additional embodiments, the bearing comprises a spherical bearing.

In particular embodiments, the rotor blade may further include at least one sleeve positioned circumferentially around at least one of the bearing and/or the bearing retention housing. In such embodiments, the compliant structure(s) may be the sleeve(s).

In alternative embodiments, the rotor blade may include a bushing received within the pin joint slot of the chord-wise member. In such embodiments, the compliant structure(s) may be the bushing.

In further embodiments, the compliant material may include, for example, an elastomeric material, a resin material, a laminate material, a graphene material, a cellulosic material, or any other suitable compliant material.

In certain embodiments, the chord-wise member may further include one or more grooves to support bending loads of the chord-wise joint. In another embodiment, the chord-wise member may have a butterfly cross-section.

In another aspect, the present disclosure is directed to a method of joining first and second blade segments of a rotor blade of a wind turbine. The method includes providing the first blade segment having a beam structure that extends in a generally span-wise direction. The beam structure has a receiving end with at least one span-wise extending pin extending therefrom. The method also includes providing the second blade segment having a receiving section that extends in the generally span-wise direction. The receiving section includes a chord-wise member having a pin joint slot defined therethrough. Further, the method includes inserting the beam structure of the first blade segment into the receiving section of the second blade segment such that the pin joint slot receives the span-wise extending pin of the beam structure so as to secure the first and second blade segments together at a chord-wise joint. Moreover, at least one of the chord-wise member, the pin joint slot, and/or the span-wise extending pin includes at least one compliant structure formed of a compliant material that allows a deformation thereof to follow a shear deformation of the rotor blade. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
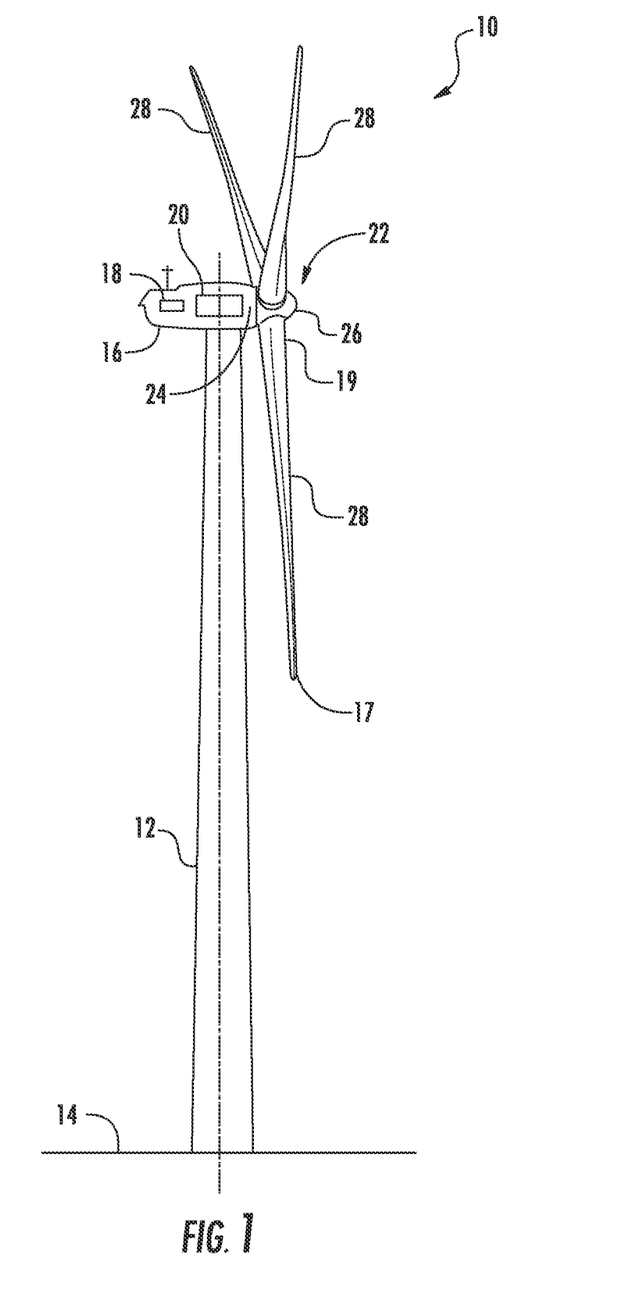
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
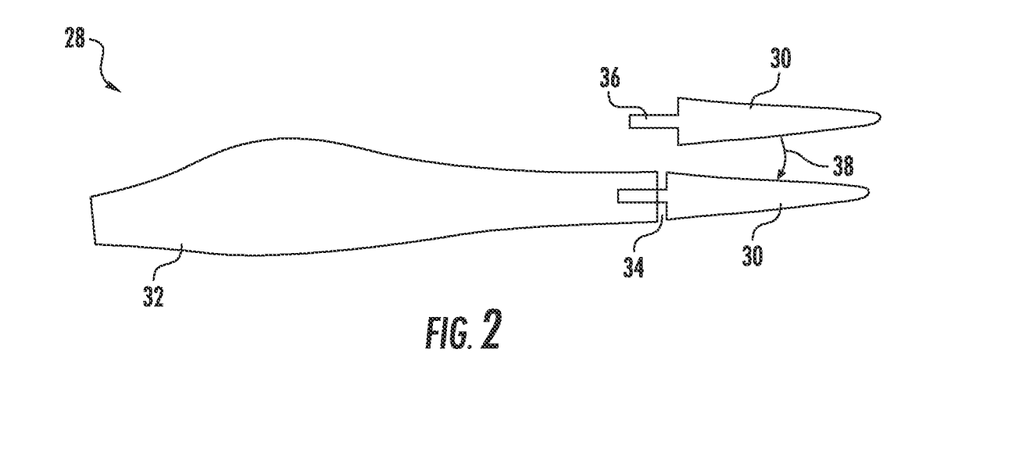
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member, such as a pressure side shell member, a suction side shell member, a leading edge shell member, a trailing edge shell member and so on. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with the beam structure 40 of the first blade segment 30 (which is shown in more detail in FIGS. 3 and 5).

Figure 3:
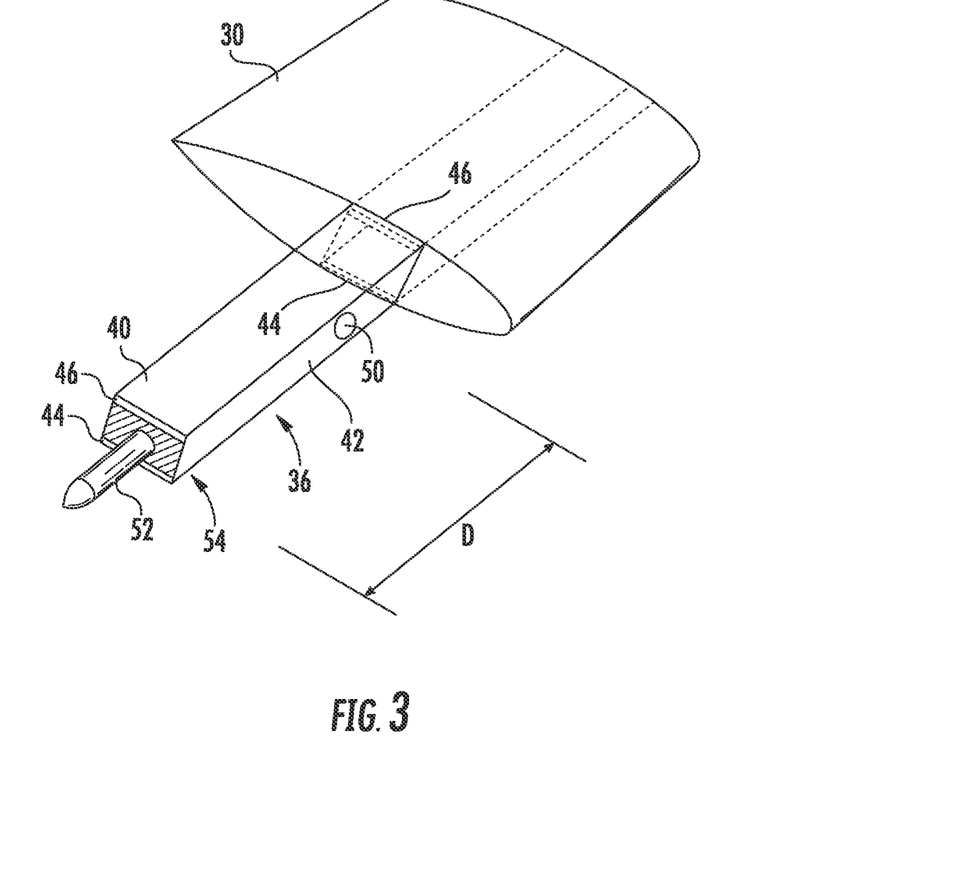
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 42 connected with a suction side spar cap 44 and a pressure side spar cap 46. Moreover, as shown, the first blade segment 30 may include one or more first pin joints at a receiving end 54 of the beam structure 40. In one embodiment, the pin joint may include a pin that is in a tight interference fit with a bushing. More specifically, as shown, the pin joint(s) may include one pin tube 52 located on the receiving end 54 of the beam structure 40. Thus, as shown, the pin tube 52 may be oriented in a span-wise direction, i.e. along the span or length of the rotor blade 28 which is defined along an axis that extends from the blade root to the blade tip of the rotor blade 28. Further, the first blade segment 30 may also include a pin joint slot 50 located on the beam structure 40. Moreover, as shown, the pin joint slot 50 may be oriented in a chord-wise direction, i.e. along a chord of the rotor blade 28 which is defined along an axis that extends from the leading edge to the trailing edge of the rotor blade 28.

Figure 4:
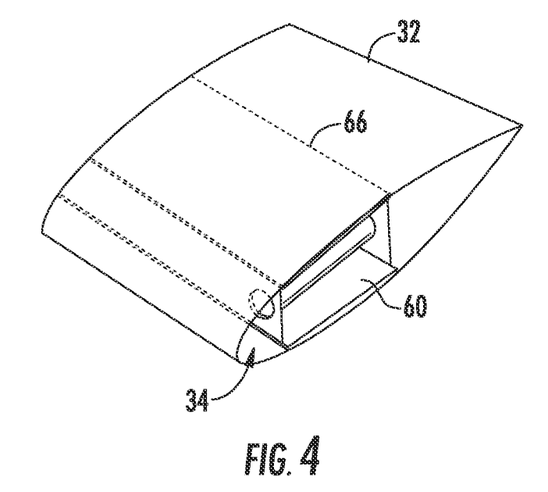
FIG. 4 illustrates a perspective view of one embodiment of a section of the second blade segment at the chord-wise joint according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30. In addition, as shown, the receiving section 60 may include a chord-wise member 48 having a span-wise pin joint slot 56 defined therethrough. Moreover, as shown, the receiving section 60 may include a chord-wise pin joint slot 58 defined therethrough that aligns with the pin joint slot 50 of the beam structure 40.

Figure 5:
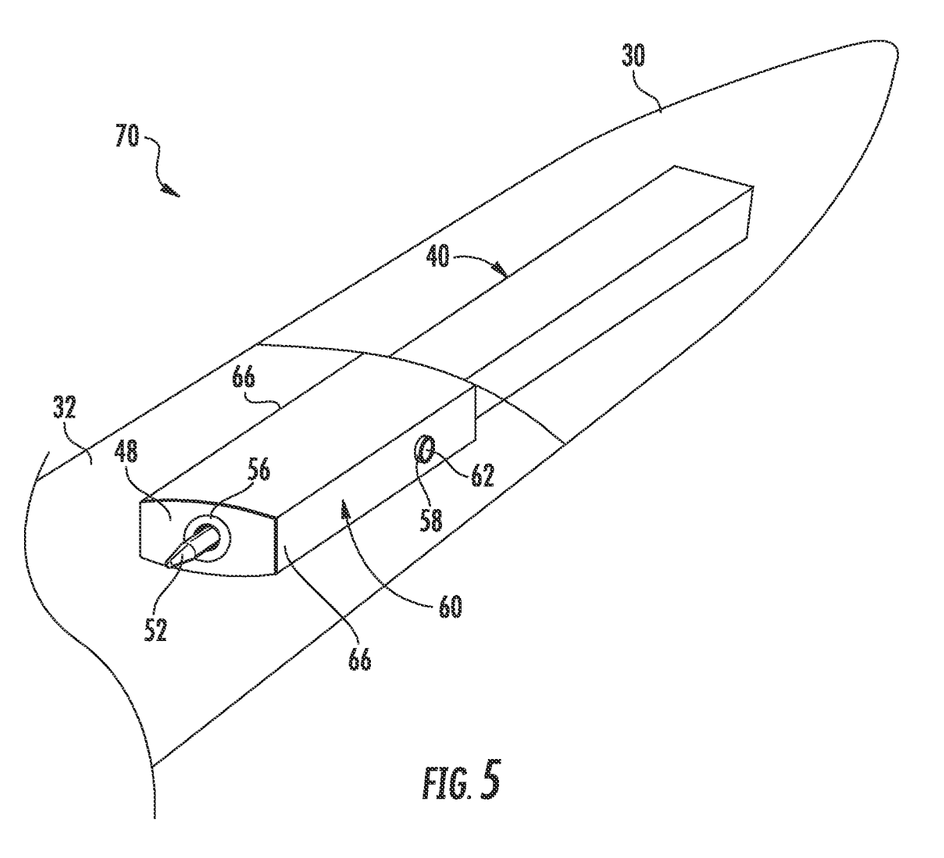
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. More specifically, as shown, the span-wise extending pin 52 of the receiving end 54 of the beam structure 40 is received within the span-wise pin joint slot 56 of the receiving section 60 so as to secure the first and second blade segments 30, 32 together.

Figure 6:
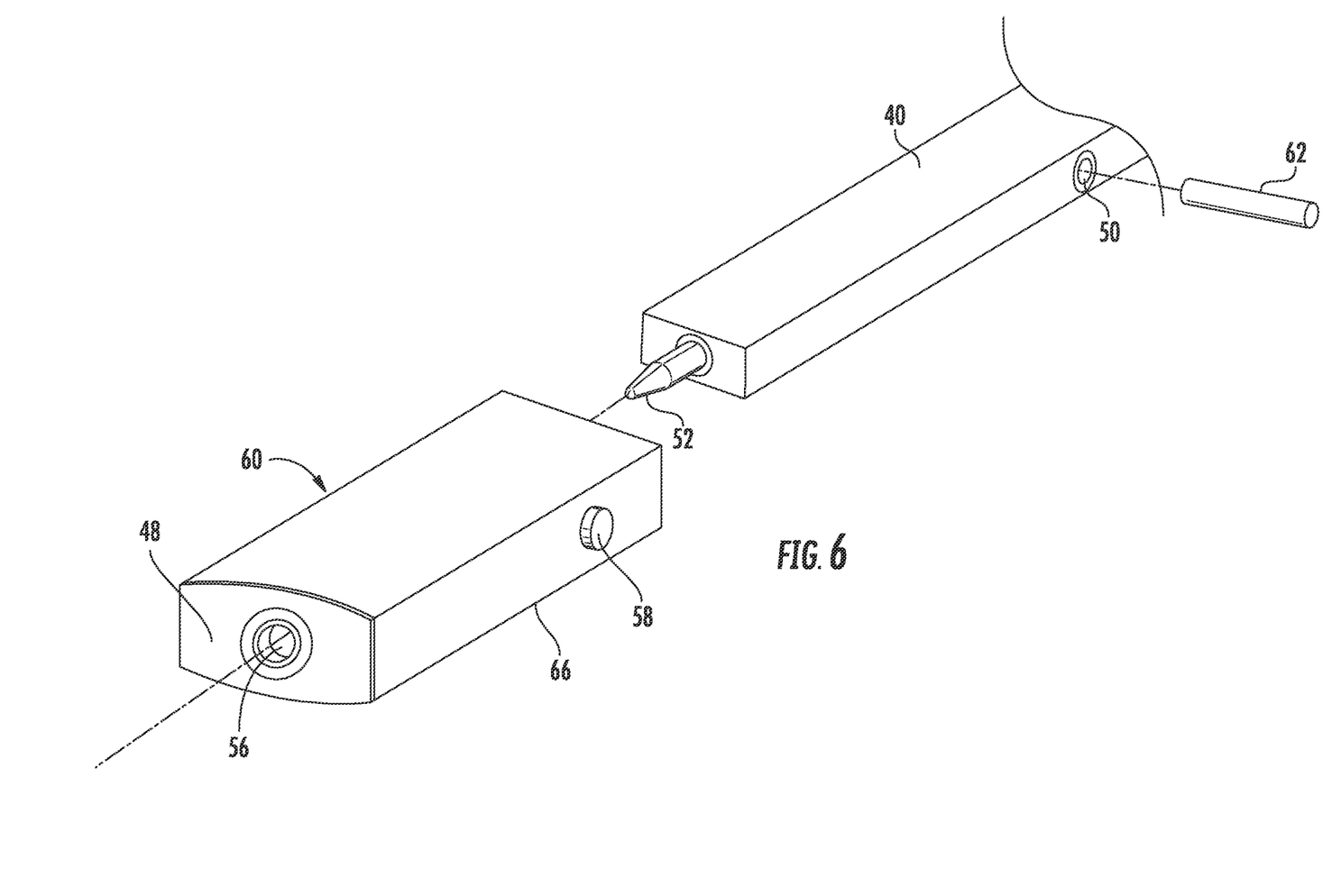
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the spar structures 66 are configured to receive the beam structure 40 and may include the chord-wise pin joint slot 58 that align with the pin joint slot 50 of the beam structure 40 through which a chord-wise extending pin 62 may be inserted. Further, as shown, the chord-wise extending 62 may be configured to remain in a tight interference fit within the aligning pin joint slots 50, 58 such that spar structures 66 and the beam structure 40 are joined together during assembly. Further, FIG. 6 also illustrates the chord-wise member 48 that includes the pin joint slot 56 configured for receiving the pin tube 52 of the beam structure 40. As such, the pin tube 52 is configured to form a tight interference fit joint.

Figure 7:
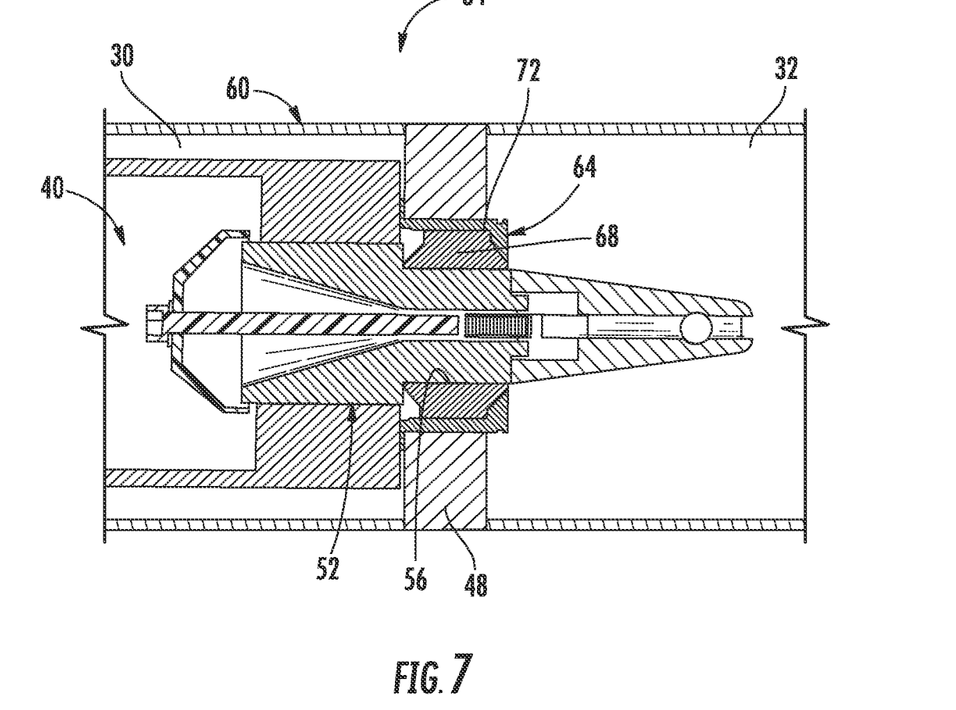
FIG. 7 illustrates a cross-sectional view of one embodiment of the chord-wise joint 34 according to the present disclosure.
Figure 8:
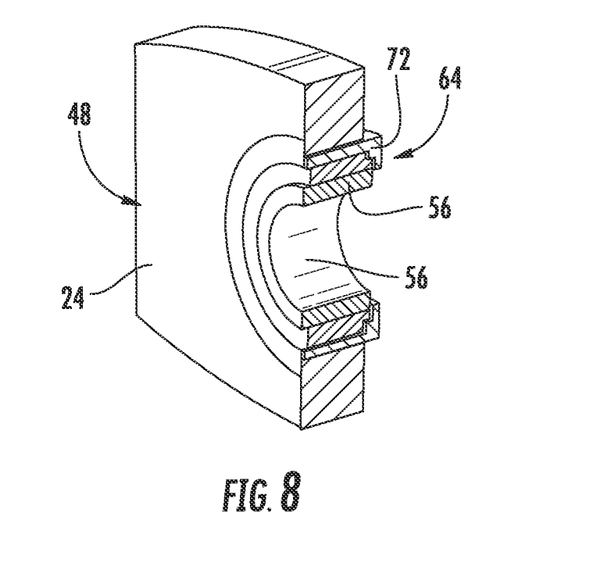
FIG. 8 illustrates a perspective, cross-sectional view of one embodiment of the chord-wise member according to the present disclosure.

Referring now to FIG. 7, a detailed, cross-sectional view of the chord-wise joint 34 according to the present disclosure is illustrated. As shown, the span-wise extending pin 52 that extends from the beam structure 40 of the first blade segment is received within the receiving section 60 of the second blade segment 32 through the chord-wise member 48. In addition, as shown in FIGS. 7 and 8, the chord-wise member 48 may include the span-wise pin joint slot 56. More specifically, as shown, the chord-wise member 48 may include a bearing assembly 64 received within the pin joint slot 56. Further, as shown, the bearing assembly 64 includes a bearing 68 received within a bearing retention housing 72. As such, the span-wise extending pin 52 may be received within the bearing 68 of the bearing assembly 64. In additional embodiments, the bearing 68 may include a spherical bearing.

Referring to FIGS. 9-13, multiple views of various embodiments of the components of the chord-wise joint 34 of the rotor blade 28 are illustrated. More specifically, as will be discussed in more detail herein, the chord-wise member 48, the pin joint slots 50, 56, and/or the span-wise extending pin 52 may include or may be constructed of a compliant structure/material that allows a deformation thereof to follow a shear deformation of the rotor blade 28. As used herein, a compliant structure generally refers to a flexible mechanism or material that transfers an input force and displacement at one location to an output force and displacement at another location through elastic body deformation. Example compliant materials as used herein may include, for example, an elastomeric material, a resin material, a laminate material, a graphene material, a cellulosic material, or any other suitable compliant material.

Figure 9:
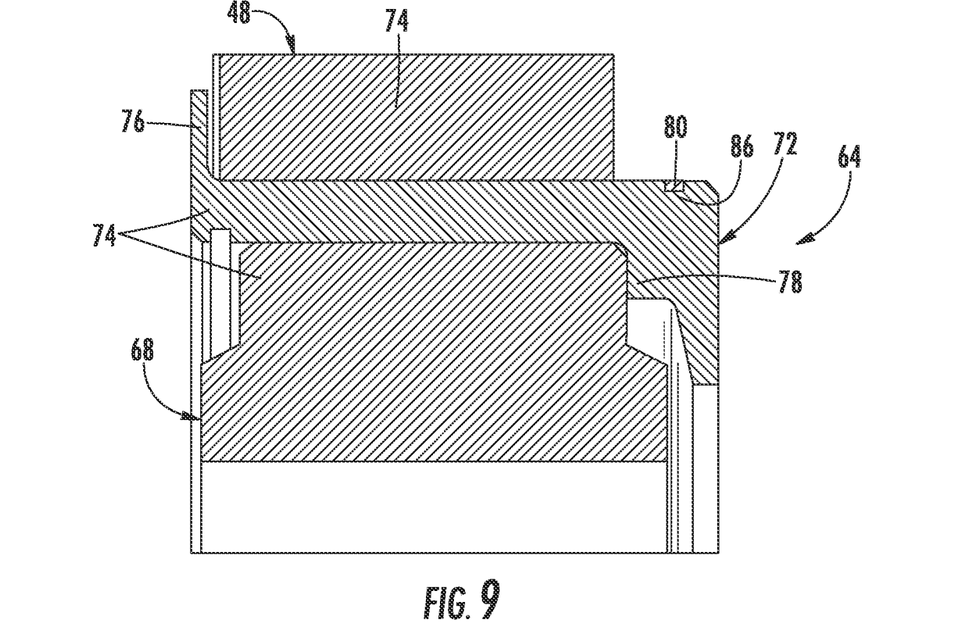
FIG. 9 illustrates a partial, cross-sectional view of one embodiment of the chord-wise member according to the present disclosure, particularly illustrating the bearing and bearing retention housing constructed of a compliant material.
Figure 10:
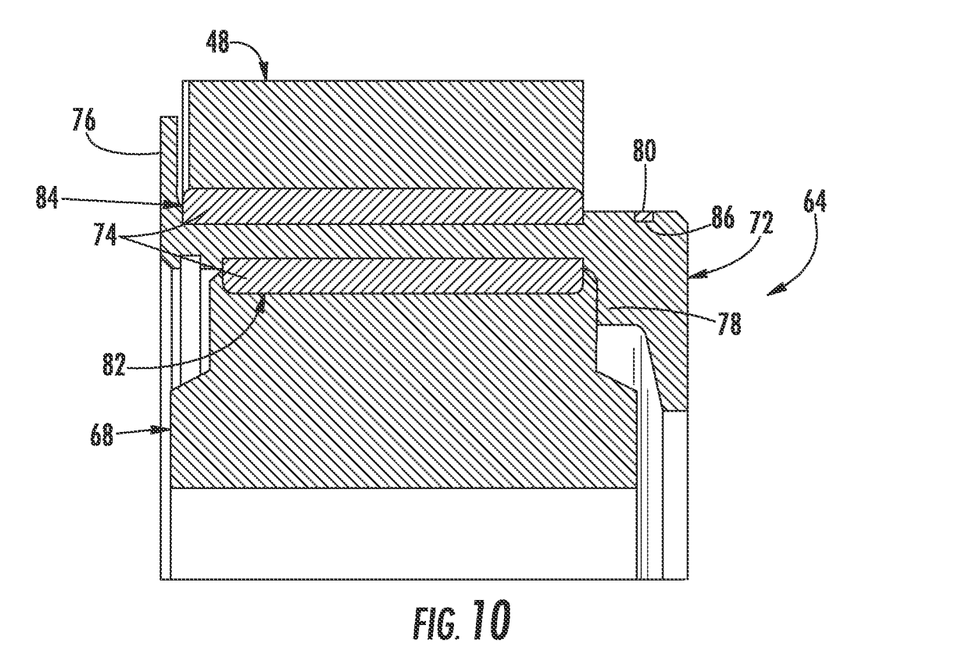
FIG. 10 illustrates a partial, cross-sectional view of another embodiment of the chord-wise member according to the present disclosure, particularly illustrating a plurality of sleeves constructed of a compliant material arranged at the chord-wise joint.

Referring specifically to FIGS. 9 and 10, cross-sectional views of one embodiment of the chord-wise member 48 according to the present disclosure are illustrated to depict possible locations of the compliant structure(s)/material(s). For example, as shown in FIG. 9, the chord-wise member 48, the bearing retention housing 72, and/or the bearing 68 may be constructed of a compliant material 74. In certain embodiments, portions of the chord-wise member 48, the bearing retention housing 72, and/or the bearing 68 include the compliant material 74, however, it should be understood that the entire the chord-wise member 48, the entire bearing retention housing 72, and/or the entire bearing 68 may be formed of the compliant material. In addition, it should be understood that the span-wise extending pin 52 may also be constructed of the compliant material 74.

Referring specifically to FIG. 10, the compliant structure(s) may include one or more sleeves 82, 84 constructed of the compliant material 74. More specifically, as shown, the chord-wise joint 34 may include a sleeve 82 positioned circumferentially around the bearing 68. In addition, as shown, the chord-wise joint 34 may include a sleeve 84 positioned circumferentially around the bearing retention housing 72. Thus, the sleeves 82, 84 are configured to support the transfer of loads/stresses and deflection more evenly to the chord-wise member 48. In addition, the sleeves 82, 84 are configured to allow for smaller bearings to be used with the same chord-wise member 48 pin joint slot 56 and bearing retention housing 72.

Referring to FIGS. 9 and 10, the bearing retention housing 72 may be axially secured within the pin joint slot 56 of the chord-wise member 48, at least in part, via a first flange 76. For example, as shown, the first flange 76 is a radial flange that extends around the circumferences of the pin joint slot 56. In addition, as shown, the bearing retention housing 72 may also include a second flange 78, e.g. to limit rotation of the bearing 68 within the bearing retention housing 72, e.g. by about 4-5 degrees. In such embodiments, as shown, the second flange 78 may be located on an opposite side of the bearing retention housing 72 from the first flange 76. In further embodiments, as shown, the bearing retention housing 72 may be further axially secured within the pin joint slot 56 of the chord-wise member 48, at least in part, via a retaining ring 86 positioned in a radial recess 80 of the bearing retention housing 72.

Figure 11:
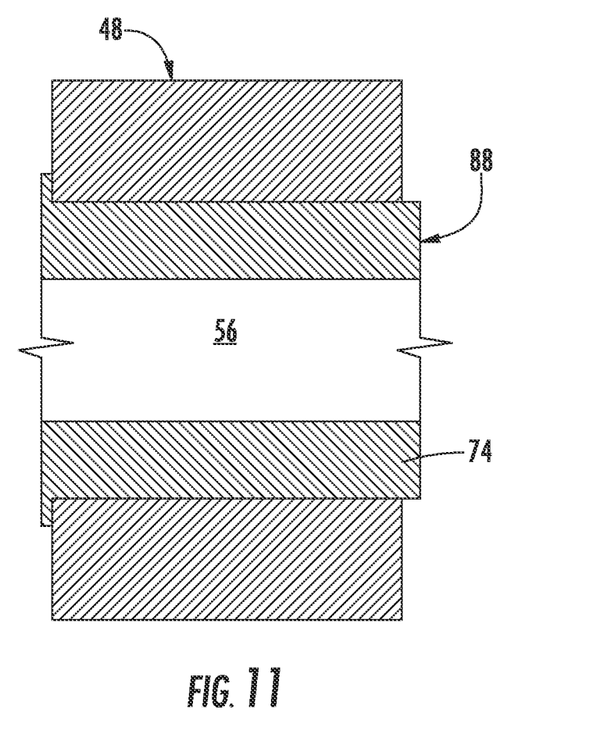
FIG. 11 illustrates a partial, cross-sectional view of yet another embodiment of the chord-wise member according to the present disclosure, particularly illustrating a bushing constructed of a compliant material received with a pin joint slot of the chord-wise member.

Referring now to FIG. 11, in alternative embodiments, the chord-wise member 48 may include a bushing 88 received within the pin joint slot 56 thereof. In such embodiments, as shown, the bushing 88 may be constructed of the compliant material 74 so as to transfer the loads/stresses at the chord-wise joint 34.

Figure 12:
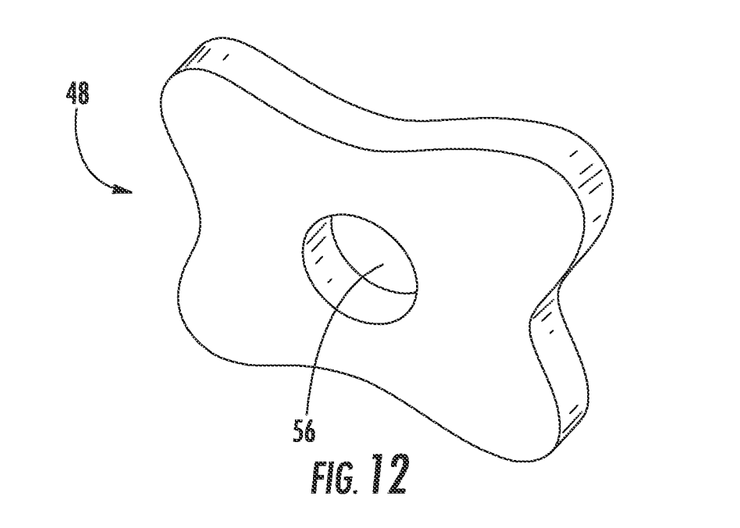
FIG. 12 illustrates a perspective view of one embodiment of the chord-wise member according to the present disclosure.
Figure 13:
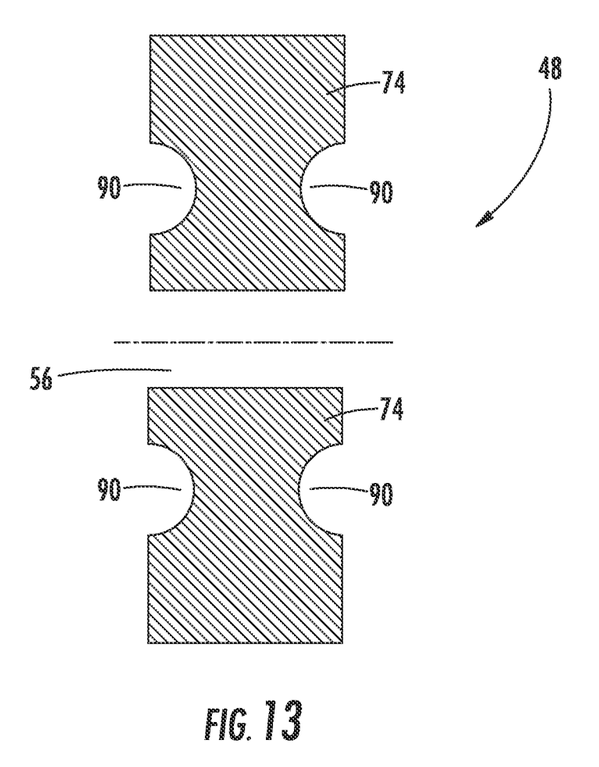
FIG. 13 illustrates a cross-sectional view of one embodiment of the chord-wise member according to the present disclosure, particularly illustrating grooves formed into the chord-wise member.

Referring now to FIGS. 12 and 13, additional features may be provided in the chord-wise member 48 to further support the various loads/stresses of the joint 4. For example, as shown in FIG. 12, the chord-wise member 48 may have a generally butterfly cross-section to improve flexibility thereof to allow the shape to follow the blade shear deformation. In addition, as shown in FIG. 13, the chord-wise member 48 may further include one or more grooves 90 to support bending loads of the chord-wise joint 34.

Figure 14:
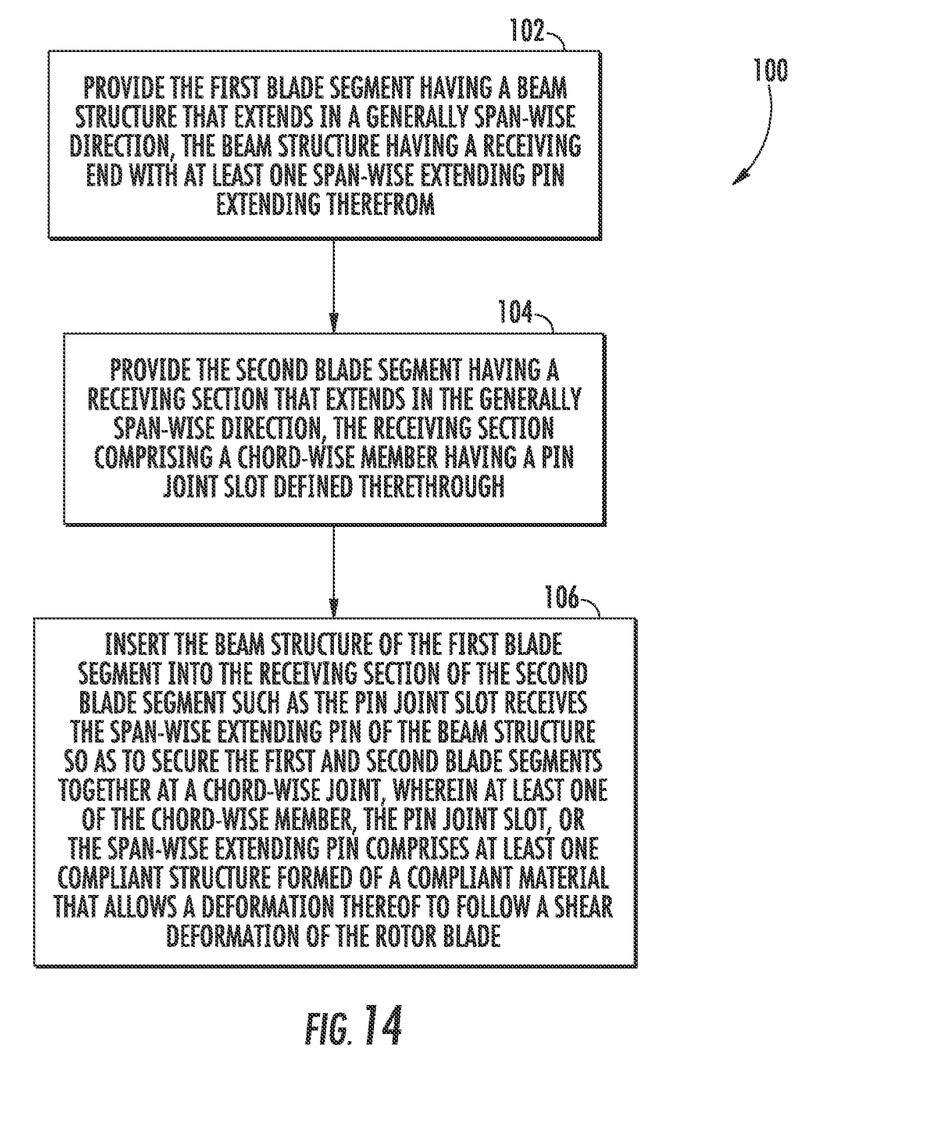
FIG. 14 illustrates a flow chart of one embodiment of a method of joining first and second blade segments of a rotor blade of a wind turbine according to the present disclosure.

Referring now to FIG. 14, a flow chart 100 of a method of joining first and second blade segments of a rotor blade of a wind turbine according to the present disclosure is illustrated. In general, the method 100 will be described herein with reference to the wind turbine 10 and the rotor blade 28 shown in FIGS. 1-13. However, it should be appreciated that the disclosed method 100 may be implemented with rotor blades having any other suitable configurations. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include providing the first blade segment 30 having the beam structure 40 that extends in a generally span-wise direction. As mentioned, the beam structure 40 has a receiving end 54 with at least one span-wise extending pin 52 extending therefrom. As such, as shown at (104), the method 100 may include providing the second blade segment 32 having the receiving section 60 that extends in the generally span-wise direction. As mentioned, the receiving section 60 includes a chord-wise member 48 having a pin joint slot 56 defined therethrough. Thus, as shown at (106), the method 100 may include inserting the beam structure 40 of the first blade segment 30 into the receiving section 60 of the second blade segment 32 such that the pin joint slot 56 receives the span-wise extending pin 52 of the beam structure 40 so as to secure the first and second blade segments 30, 32 together at a chord-wise joint 34. Moreover, the chord-wise member 48, the pin joint slot 56, and/or the span-wise extending pin 52 includes at least one compliant structure formed of a compliant material that allows a deformation thereof to follow a shear deformation of the rotor blade 28.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A rotor blade for a wind turbine, comprising:
 a first blade segment and a second blade segment extending in opposite directions from a chord-wise joint, each of the first and second blade segments comprising at least one shell member defining an airfoil surface, the first blade segment comprising a beam structure having a receiving end, the receiving end comprising at least one span-wise extending pin extending therefrom, the second blade segment comprising a receiving section that receives the beam structure of the first blade segment, the receiving section comprising a chord-wise member having a pin joint slot defined therethrough, the pin joint slot receiving the span-wise extending pin at the receiving end of the beam structure so as to secure the first and second blade segments together, and
 a bearing assembly comprising a bearing received within a bearing retention housing, the bearing assembly received within the pin joint slot;
 at least one sleeve positioned circumferentially around the bearing between the bearing and the bearing retention housing,
 wherein at least one of the chord-wise member, the pin joint slot, the bearing, the bearing retention housing, or the span-wise extending pin comprises at least one compliant structure formed of a compliant material that allows a deformation thereof to follow a shear defor- mation of the rotor blade, and wherein the at least one sleeve is constructed of the compliant material.

2. The rotor blade of claim 1, wherein a body of at least one of the chord-wise member or the span-wise extending pin is constructed of the compliant material.

3. The rotor blade of claim 1, wherein the bearing retention housing is axially secured within the pin joint slot of the chord-wise member, at least in part, via a first flange.

4. The rotor blade of claim 3, wherein the bearing retention housing further comprises a second flange for limiting rotation of the bearing within the bearing retention housing, the second flange on an opposite side of the bearing retention housing from the first flange.

5. The rotor blade of claim 3, wherein the bearing retention housing is further axially secured within the pin joint slot of the chord-wise member, at least in part, via a retaining ring.

6. The rotor blade of claim 1, wherein the bearing comprises a spherical bearing.

7. The rotor blade of claim 1, further comprising a bushing received within the pin joint slot of the chord-wise member, the at least one compliant structure comprising the bushing.

8. The rotor blade of claim 1, wherein the compliant material comprises at least one of an elastomeric material, a resin material, a laminate material, a graphene material, or a cellulosic material.

9. The rotor blade of claim 1, wherein the chord-wise member further comprises one or more grooves on one or more radially outer surfaces of the chord-wise member to support bending loads of the chord-wise joint, the one or more grooves being separate from the pin joint slot.

10. The rotor blade of claim 1, wherein the chord-wise member comprises a butterfly cross-section.

11. A method of joining first and second blade segments of a rotor blade of a wind turbine, the method comprising:
providing the first blade segment having a beam structure that extends in a generally span-wise direction, the beam structure having a receiving end with at least one span-wise extending pin extending therefrom;
providing the second blade segment having a receiving section that extends in the generally span-wise direction, the receiving section comprising a chord-wise member having a pin joint slot defined therethrough; and,
inserting the beam structure of the first blade segment into the receiving section of the second blade segment such that the pin joint slot receives the span-wise extending pin of the beam structure so as to secure the first and second blade segments together at a chord-wise joint;
securing a bearing within a bearing retention housing to form a bearing assembly;
securing the bearing assembly within the pin joint slot, the at least one compliant structure comprising at least one of the bearing or the bearing retention housing; and
placing at least one sleeve positioned circumferentially around the bearing between the bearing and the bearing retention housing,
wherein at least one of the chord-wise member, the pin joint slot, the bearing, the bearing retention housing, or the span-wise extending pin comprises at least one compliant structure formed of a compliant material that allows a deformation thereof to follow a shear deformation of the rotor blade, and wherein the at least one sleeve is constructed of the compliant material.

12. The method of claim 11, wherein at least one of the chord-wise member or the span-wise extending pin is constructed of the compliant material.

13. The method of claim 11, wherein the bearing comprises a spherical bearing.

14. The method of claim 11, further comprising placing a bushing within the pin joint slot of the chord-wise member, the at least one compliant structure comprising the bushing.

15. The method of claim 11, wherein the compliant material comprises at least one of an elastomeric material, a resin material, a laminate material, a graphene material, or a cellulosic material.

16. The method of claim 11, further comprising forming one or more grooves on one or more radially outer surfaces of the chord-wise member to support bending loads of the chord-wise joint, the one or more grooves being separate from the pin joint slot.

\* \* \* \* \*